(12) United States Patent
Varin et al.

(10) Patent No.: US 9,239,093 B2
(45) Date of Patent: Jan. 19, 2016

(54) DECOUPLING PULLEY

(75) Inventors: Hervé Varin, Joue-les-Tours (FR); François Champalou, Chaumont sur Loire (FR); Olivier Soria, Rilly sur Loire (FR)

(73) Assignee: Hutchinson, Paris (FR)

( * ) Notice: Subject to any disclaimer, the term of this patent is extended or adjusted under 35 U.S.C. 154(b) by 75 days.

(21) Appl. No.: 13/127,995

(22) PCT Filed: Apr. 28, 2011

(86) PCT No.: PCT/IB2011/051882
§ 371 (c)(1),
(2), (4) Date: Nov. 27, 2012

(87) PCT Pub. No.: WO2011/135540
PCT Pub. Date: Nov. 3, 2011

(65) Prior Publication Data
US 2013/0062155 A1 Mar. 14, 2013

(30) Foreign Application Priority Data
Apr. 30, 2010 (FR) ...................................... 10 01859

(51) Int. Cl.
*F16D 41/20* (2006.01)
*F16F 15/121* (2006.01)
*F16H 55/36* (2006.01)

(52) U.S. Cl.
CPC ............ *F16F 15/1213* (2013.01); *F16H 55/36* (2013.01); *F16H 2055/366* (2013.01)

(58) Field of Classification Search
CPC . F16F 15/1213; F16H 55/36; F16H 2055/366
USPC ......... 192/41 S, 56.62, 54.2, 55.1, 55.5, 45.1, 192/46, 110 B, 55.53; 474/13, 161, 70, 135, 474/199, 74, 69
See application file for complete search history.

(56) References Cited

U.S. PATENT DOCUMENTS 5,058,720 A * 10/1991 Rude et al. .................... 192/41 S
5,139,463 A    8/1992 Bytzek et al.
(Continued)

FOREIGN PATENT DOCUMENTS

CN      1668859 A     9/2005
CN    101208534 A     6/2008
(Continued)

OTHER PUBLICATIONS

Search Report for French Application No. FR 10 01 859, completed Dec. 16, 2010.
(Continued)

*Primary Examiner* — David J Hlavka
(74) *Attorney, Agent, or Firm* — Alston & Bird LLP

(57) ABSTRACT

A decoupling pulley having a rim attached to a first power transmission element, and a torsion spring mounted in a receptacle attached to a second power transmission element, one of the power transmission elements being driving and the other of the power transmission elements being driven, the receptacle is a bell inside which is centered the spring, which spring has a first and a second end region, each of which bears on a bearing face of the bell, wherein the rim has a first drive abutment having a first face cooperating with the first end region of the spring to drive the latter in the direction of closure in a first relative rotational direction between the rim and the bell, the bell includes a first bell abutment, the angular position of which defines a first given maximum value $\alpha_1$ for the travel of the first end region of the spring driven to close by the first drive abutment.

21 Claims, 20 Drawing Sheets

(56) References Cited

U.S. PATENT DOCUMENTS

| | | | |
|---|---|---|---|
| 5,156,573 A | 10/1992 | Bytzek et al. | |
| 5,722,909 A | 3/1998 | Thomey | |
| 6,044,943 A | 4/2000 | Bytzek et al. | |
| 6,083,130 A * | 7/2000 | Mevissen et al. | 474/70 |
| 6,659,248 B2 * | 12/2003 | Terada | 192/41 S |
| 7,070,033 B2 * | 7/2006 | Jansen et al. | 192/41 S |
| 7,153,227 B2 * | 12/2006 | Dell et al. | 474/70 |
| 7,207,910 B2 * | 4/2007 | Dell et al. | 474/74 |
| 7,275,630 B2 * | 10/2007 | Jansen et al. | 192/110 R |
| 7,591,357 B2 * | 9/2009 | Antchak et al. | 192/55.5 |
| 7,618,337 B2 | 11/2009 | Jansen et al. | |
| 7,624,852 B2 | 12/2009 | Mevissen et al. | |
| 7,712,592 B2 | 5/2010 | Jansen et al. | |
| 7,891,475 B2 | 2/2011 | Zhu et al. | |
| 7,954,613 B2 | 6/2011 | Mevissen et al. | |
| 7,975,821 B2 | 7/2011 | Antchak et al. | |
| 8,006,819 B2 | 8/2011 | Dell et al. | |
| 8,021,253 B2 | 9/2011 | Dell et al. | |
| 8,047,920 B2 | 11/2011 | Jansen et al. | |
| 8,132,657 B2 * | 3/2012 | Antchak et al. | 192/55.1 |
| 2006/0264280 A1 | 11/2006 | Dell et al. | |
| 2008/0108442 A1 | 5/2008 | Jansen et al. | |
| 2009/0176608 A1 | 7/2009 | Jansen et al. | |
| 2009/0194380 A1 | 8/2009 | Ali et al. | |
| 2009/0197719 A1 | 8/2009 | Ali et al. | |
| 2011/0065537 A1 | 3/2011 | Serkh et al. | |
| 2011/0256968 A1 | 10/2011 | Serkh et al. | |
| 2012/0088616 A1 | 4/2012 | Ali et al. | |

FOREIGN PATENT DOCUMENTS

| | | |
|---|---|---|
| JP | H02-253035 A | 10/1990 |
| JP | H05-52416 U | 7/1993 |
| JP | H05-52418 U | 7/1993 |
| JP | 2004-270858 A | 9/2004 |
| JP | 2004-2007858 A | 9/2004 |
| JP | 2006-234116 A | 9/2006 |
| JP | 2008-169895 A | 7/2008 |
| JP | 2008-528906 A | 7/2008 |
| WO | WO 2009/047816 A1 | 4/2009 |

OTHER PUBLICATIONS

International Search Report and Written Opinion for Application No. PCT/IB2011/051882 dated Jul. 4, 2011.

European Search Report for Application No. EP 11 16 3966 dated Jul. 5, 2011.

Office Action for European Application No. EP 11 163 966.2 dated Jun. 18, 2012.

* cited by examiner

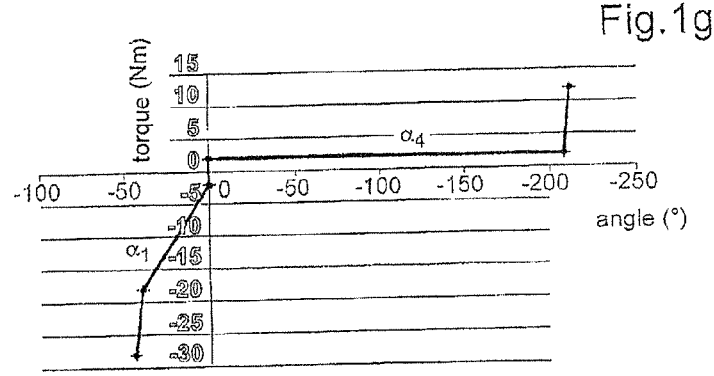
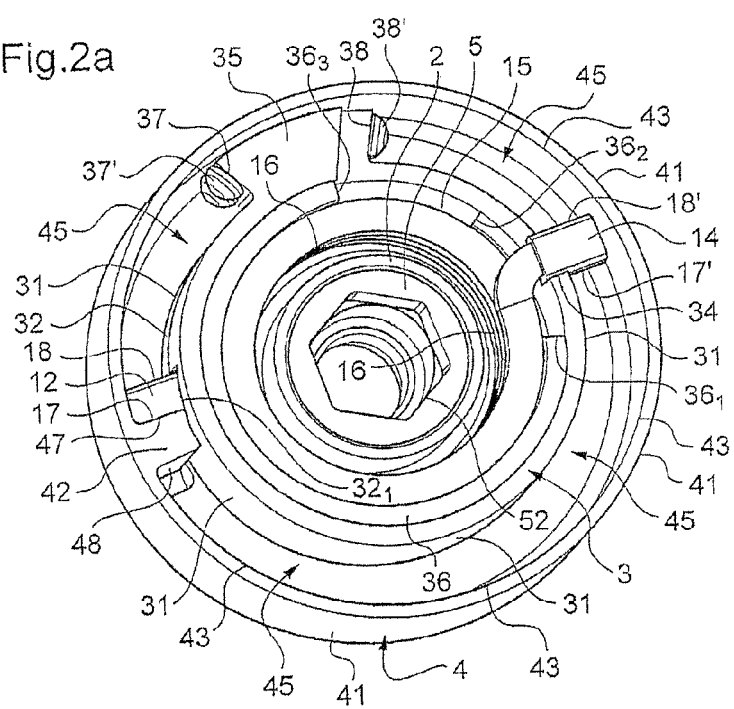

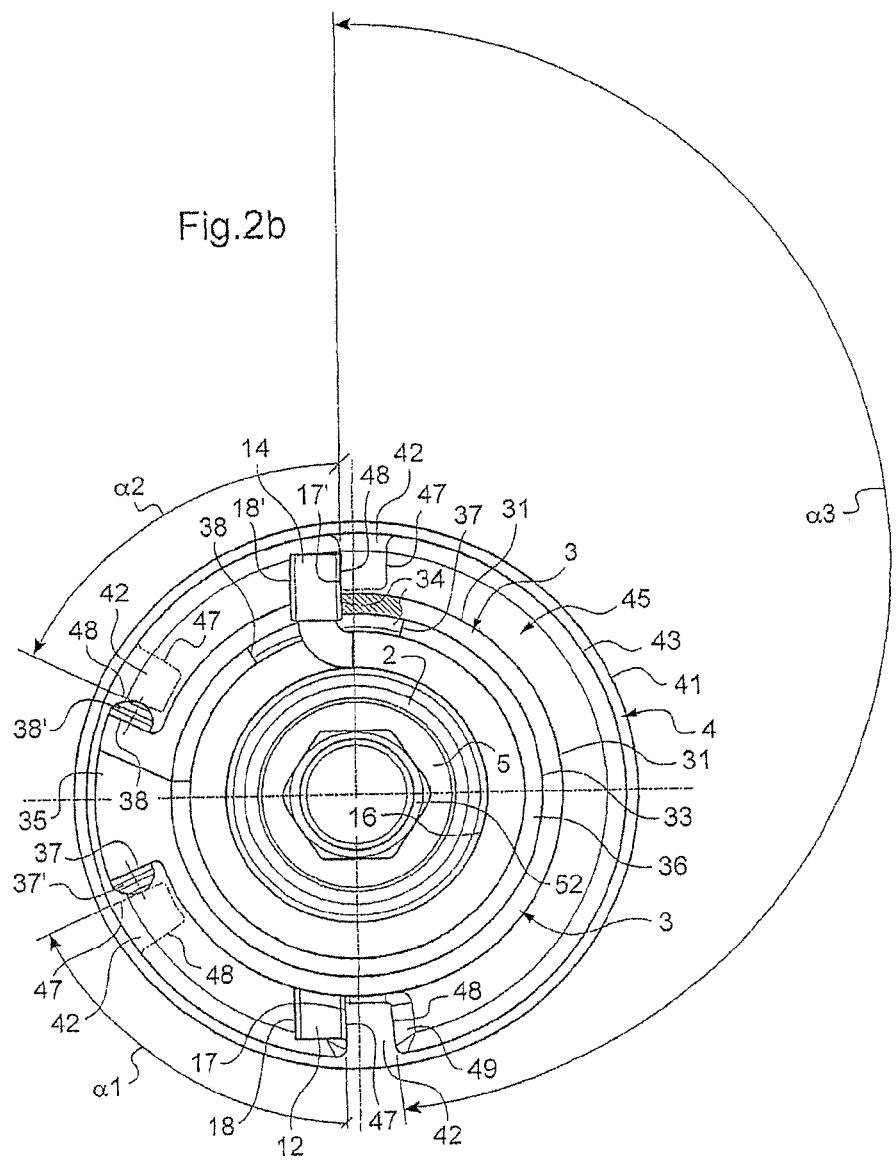

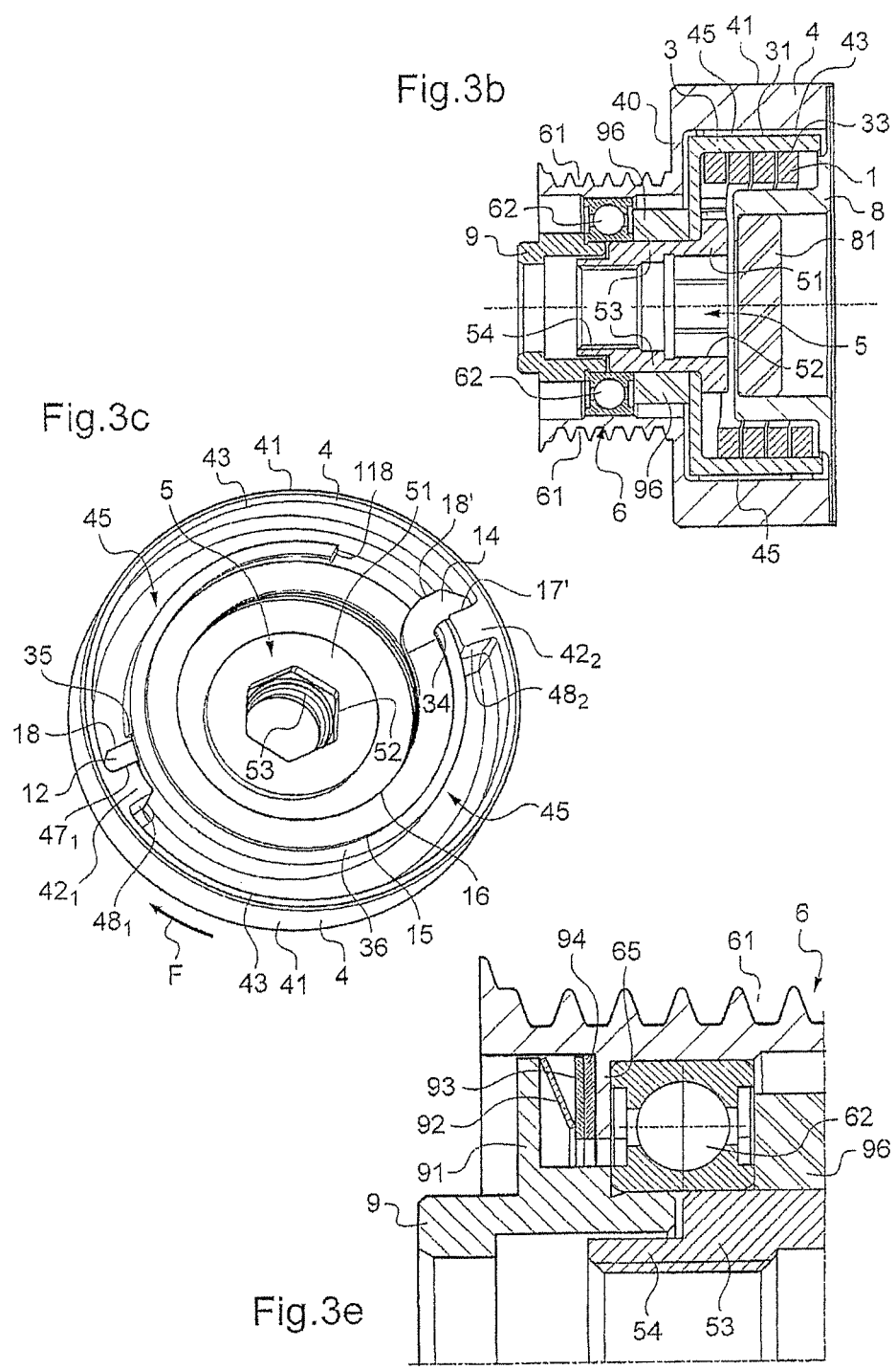

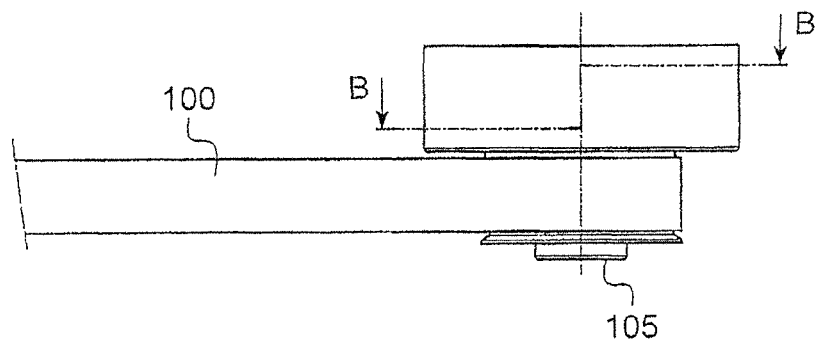
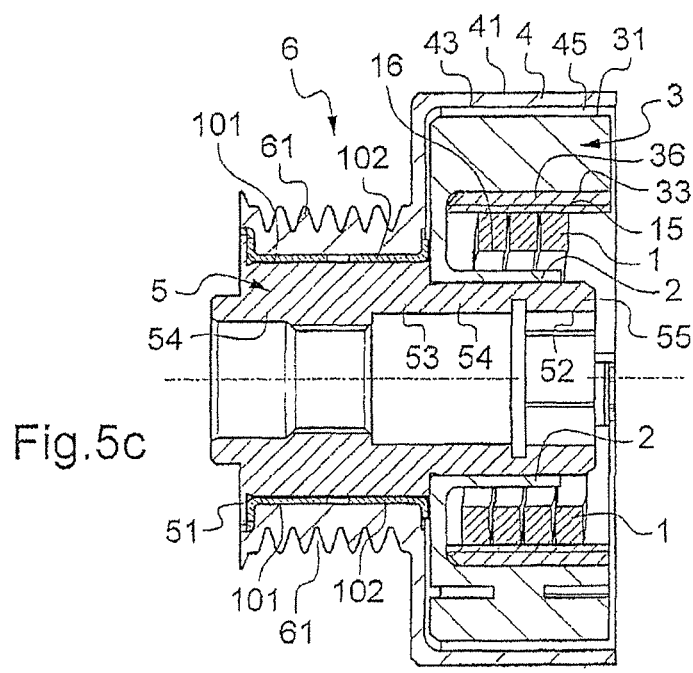

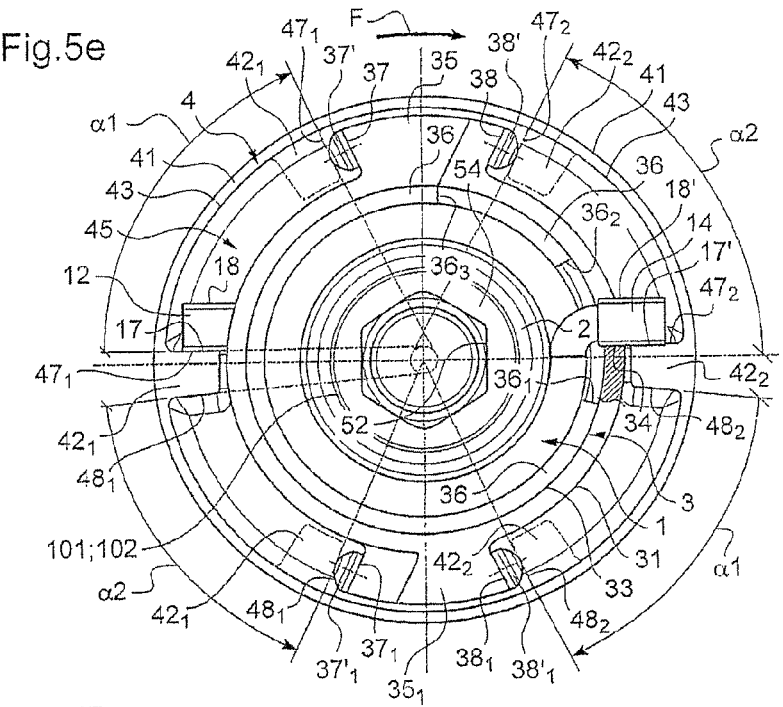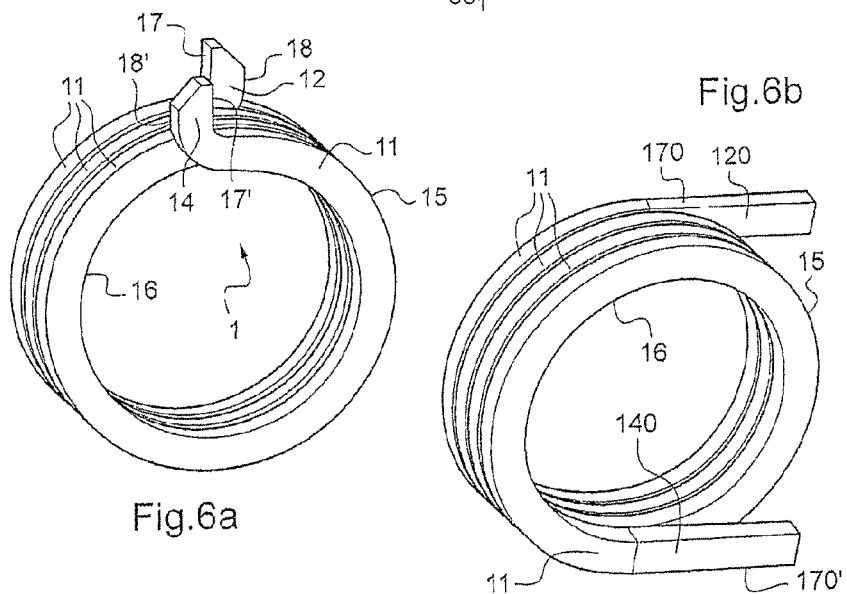

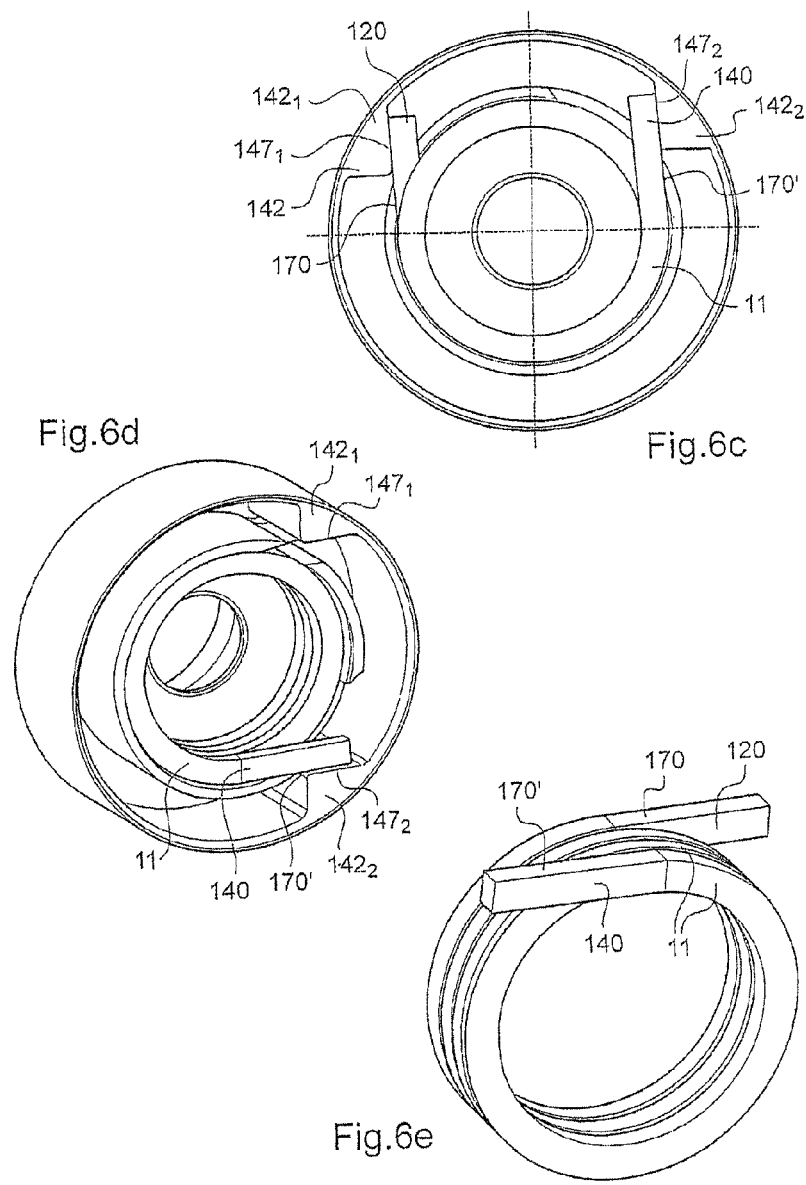

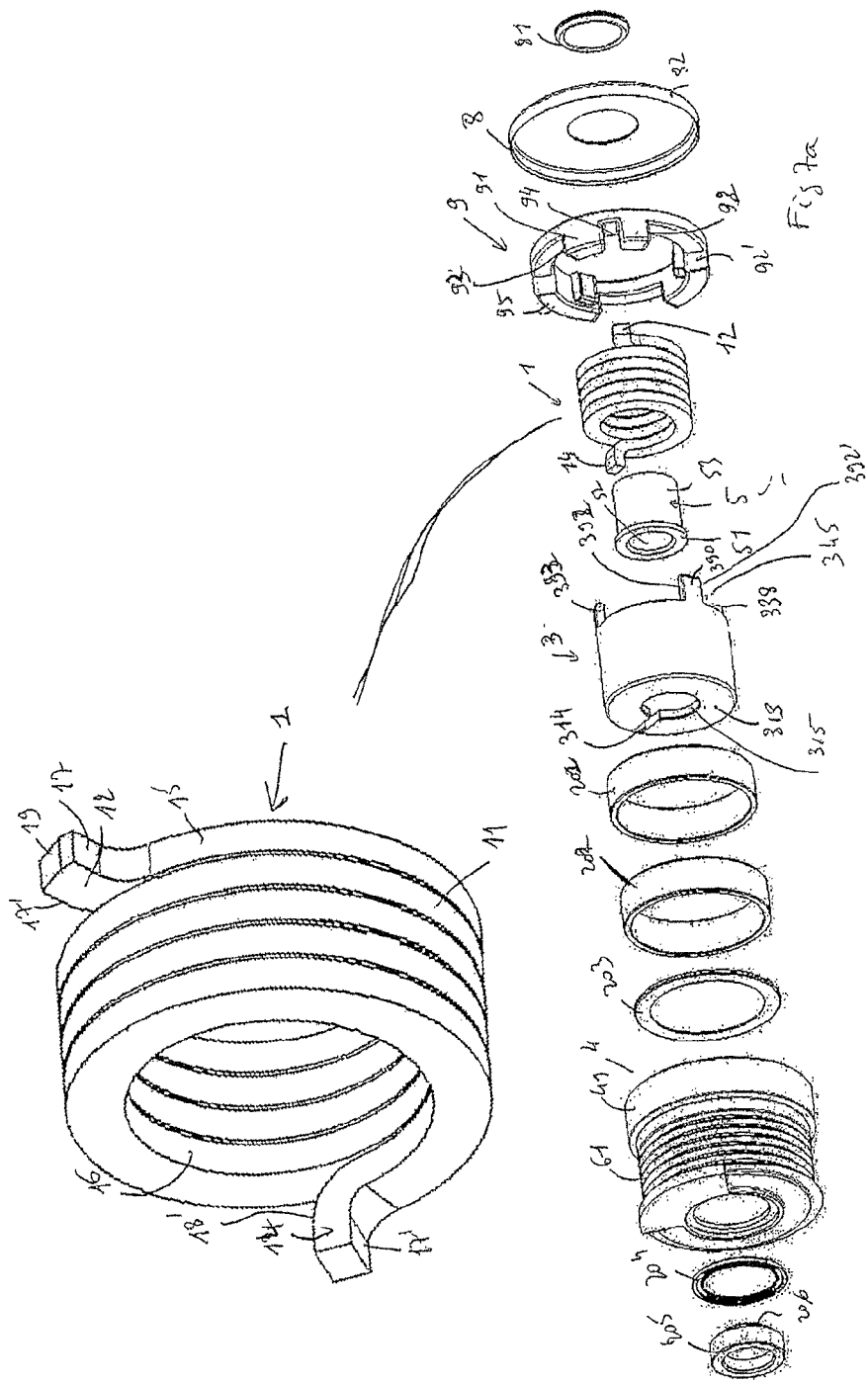

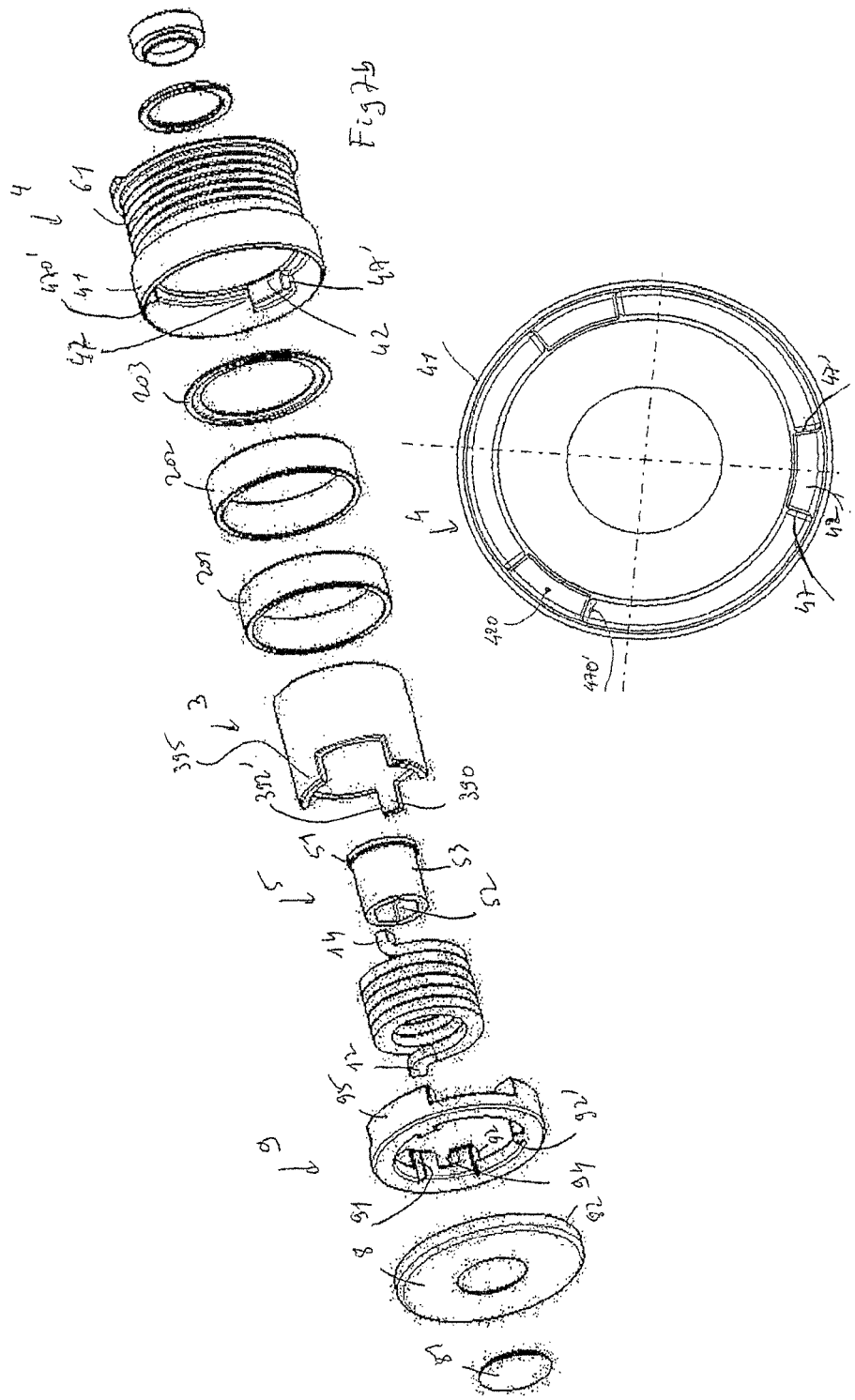

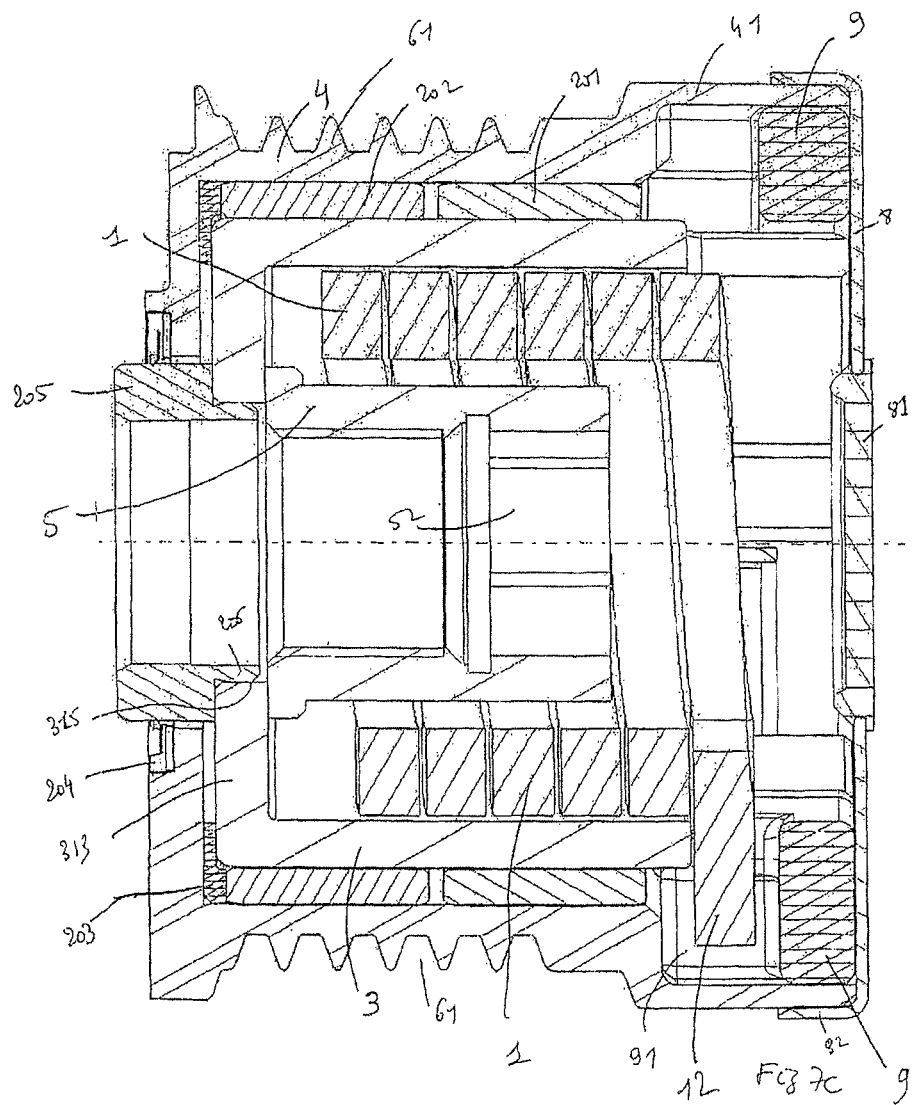

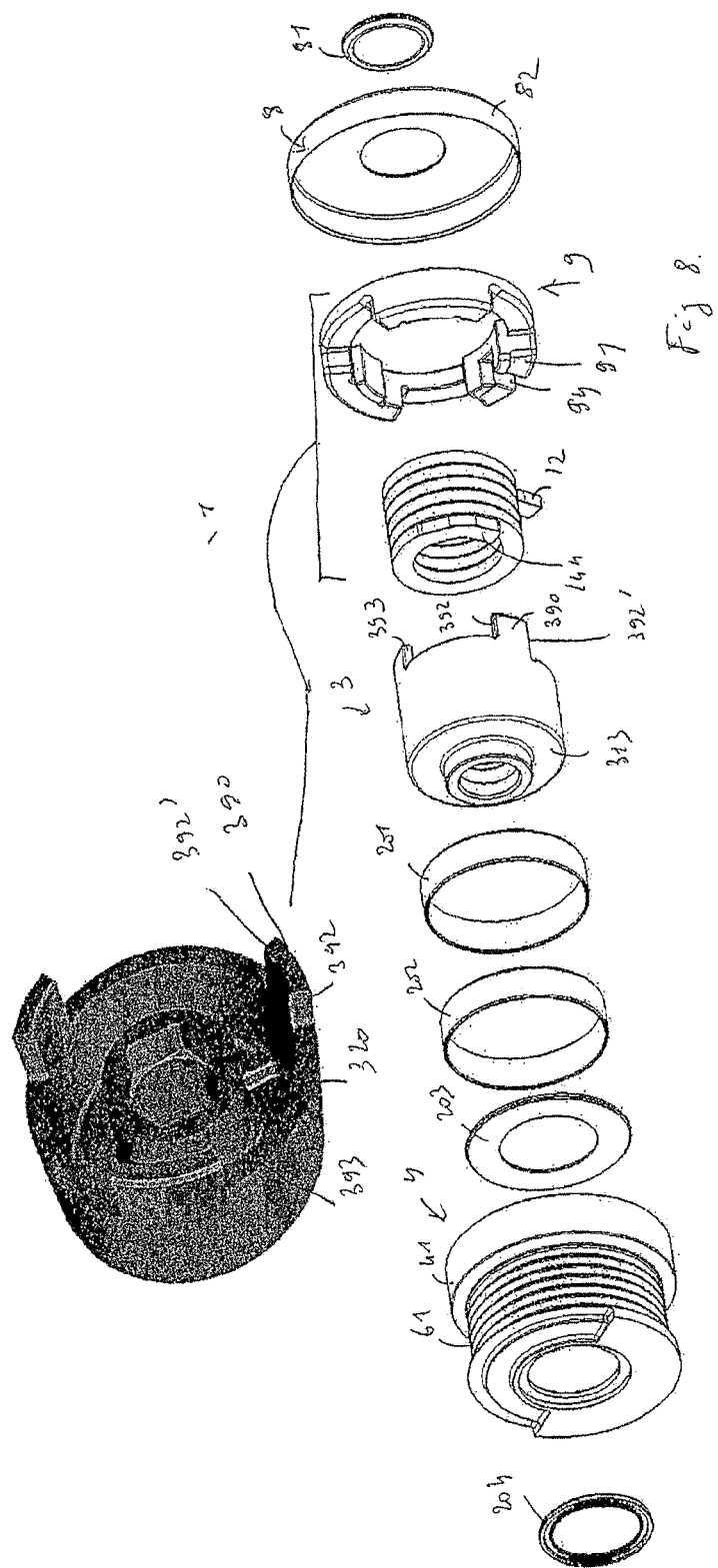

DECOUPLING PULLEY

FIELD OF THE INVENTION

The subject of the present invention is a decoupling pulley that can be used in a belt transmission system to attenuate the belt tension variations by virtue of the deformation of an elastic component interposed between a driving part which supplies the mechanical energy and a driven part.

BACKGROUND OF THE INVENTION

In the case, for example, of an alternator pulley, the rim of the pulley (driving part) is driven by the belt and the hub of the pulley which is securely attached to the alternator (driven part). The filtering elastic function (low-pass filter) is generally provided by an elastomer body.

For strongly acyclic transmission systems (significant engine irregularities) or for systems with a highly stressing usage cycle (alternator/starter, for example), the vibratory effects are such that the rubber filtering body does not generally make it possible to provide a satisfactory trade-off between lifespan and filtering efficiency. Indeed, in order to filter correctly, the torsion stiffnesses of the elastomer body have to be low whereas at the same time, the elastomer body must not be deformed too much if its lifespan is to be increased. The result is therefore very often limited lifespans with average filtering efficiencies.

Decoupling pulleys are known, the elastic stiffness of which that is necessary for the filtering is provided by a torsion spring. Decoupling pulleys intended for automobile accessories (alternator) are described notably in the patent applications US 2006/264280, US 2008/108442 and WO 2009/47816.

These pulleys provide a coupling and a decoupling of the spring via a friction system which imposes having the spring work to open, and which mandatorily impose the implementation of a decoupled operating mode incompatible with certain applications, notably the alternator/starter (SAD) pulleys.

The friction coupling/decoupling system is a source of friction, and therefore of wear, which affects the stability of the performance levels over time, and the reliability and the longevity of the product.

Similarly, it is unfavorable to have a spring work alternately to open and close to provide a coupling and a decoupling, namely a clutching and a declutching.

SUMMARY OF THE INVENTION

The present invention proposes avoiding these drawbacks by eliminating any friction coupling/decoupling system and by providing kinematics that make the spring work only to close.

The invention thus relates to a decoupling pulley comprising a rim securely attached to a first power transmission element, and a torsion spring mounted in a receptacle securely attached to a second power transmission element, one of the power transmission elements being driving and the other of the power transmission elements being driven, characterized in that the receptacle is a bell inside which is centered the spring, which spring has a first and a second end region, each of which bears on a bearing face of the bell, wherein the rim has at least one first drive abutment having a first face cooperating with the first end region of the spring to drive the latter in the direction of closure in a first relative rotational direction between the rim and the bell, and wherein the bell comprises at least one first bell abutment, the angular position of which defines a first given maximum value $\alpha_1$ for the travel of the first end region of the spring driven to close by said first drive abutment.

A torsion spring is a spring having a number of turns wound with an axial pitch (for example, helical or tapered spring).

According to a first variant, the pulley may be characterized in that only said first end region cooperates via said first face of said first drive abutment, so that the second end region of the spring bears on its bearing face.

It may then be characterized in that, for the second relative rotational direction between the rim and the bell opposite said first rotational direction, the periphery of the bell has an angular segment of free rotation for the first drive abutment over an angular travel $\alpha_4$ between the first end of the spring and a second bell abutment.

Preferably, the second spring end region is disengaged from the angular segment to allow the passage from the first drive abutment to said second bell abutment.

According to a second variant, the pulley is characterized in that said first end region and said second end region cooperate alternately according to said relative rotational direction with said first drive abutment to drive the spring to close, and in that the bell has a third bell abutment, the angular position of which defines a second given maximum value $\alpha_2$ for the travel of the second end region of the spring driven to close by a second face of the first drive abutment opposite the first face.

The bell advantageously has an angular segment of rotation with constant torque for the first drive abutment between the first and the second end of the spring.

An angular segment of rotation with constant torque may operate in free rotation mode or include a friction element to exert a braking torque.

According to a third variant, the pulley is characterized in that the spring has one said first end region cooperating with said first face of said first drive abutment and one said second end region cooperating with a first face of the second drive abutment to drive the spring in the direction of closure in a second rotational direction opposite to the first rotational direction, and in that the bell has one said third bell abutment, the angular position of which defines a second given maximum value $\alpha_2$ for the travel of the second end region of the spring driven to close by the second drive abutment.

The pulley may be characterized in that the bell has a fourth and a fifth bell abutment respectively allowing one said angular travel $\alpha_1$ for the second drive abutment when the first end of the spring is driven to close by the first face of the first drive abutment and one said angular travel $\alpha_2$ for the first drive abutment when the second end of the spring is driven to close by the first face of the second drive abutment.

The angle $\alpha_1$ may or may not be equal to the angle $\alpha_2$.

The pulley may be characterized in that at least one said bell abutment has a face cooperating with one said face of one said drive abutment to define one said given maximum value $\alpha_1$ and/or $\alpha_2$. At least one said bell abutment face may comprise at least one damping element, for example an elastic element.

The pulley may be characterized in that at least one said bell abutment has a face cooperating with one said face of an end region of the spring to define one said given maximum value $\alpha_1$ and/or $\alpha_2$.

The pulley may include a friction element introducing a constant torque between the first and the second power transmission elements.

Said first and/or second end region may be in contact with said bearing face of the bell.

Alternatively, the pulley may be characterized in that it includes an annular part centered on the bell and which has a housing which receives the first end region of the spring, this housing having at least one contact face, which is in contact with said bearing face of the bell.

The annular part may be made of a non-metallic material attenuating noises due to impacts, such as polyamide or polyurethane, or else it may have at least one contact face coated with an impact-damping material such as an elastomer or an elastomeric thermoplastic material.

The pulley may be an automobile accessory pulley, for example for an alternator in which it is the first power transmission element which is driving, and comprises teeth to receive the teeth of a K-type belt, and the second power transmission element has a coupling element for coupling to one said accessory.

The pulley may be a crankshaft pulley in which the second transmission element is driving, the second element comprising a coupling element for coupling to a crankshaft, and the first element comprising teeth to receive the teeth of a K-type belt.

The pulley may be an alternator/starter pulley for which the first transmission element may be driving or driven depending on the operating mode (starting or started).

BRIEF DESCRIPTION OF THE DRAWINGS

Other features and advantages of the invention will become more apparent from reading the following description, given as a non-limiting example, in conjunction with the drawings in which:

FIGS. 1a to 1g illustrate a first variant of the invention in which a single drive abutment cooperates with a single end region of the spring, with two perspective views of the pulley (1a and 1d), a view of the spring (1b), and two front views of the pulley (1c and 1e), FIGS. 1f and 1g being characteristics of torque (in Nm) as a function of the angle (degrees);

FIGS. 2a to 2g illustrate a second variant of the invention in which a single drive abutment cooperates alternately with one or other end region of the spring, with three perspective views of the pulley (2a, 2c and 2d), two front views of the pulley (2b), whereas FIGS. 2f and 2g are characteristics of torque (in Nm) as a function of the angle (in degrees);

Figure 4A:
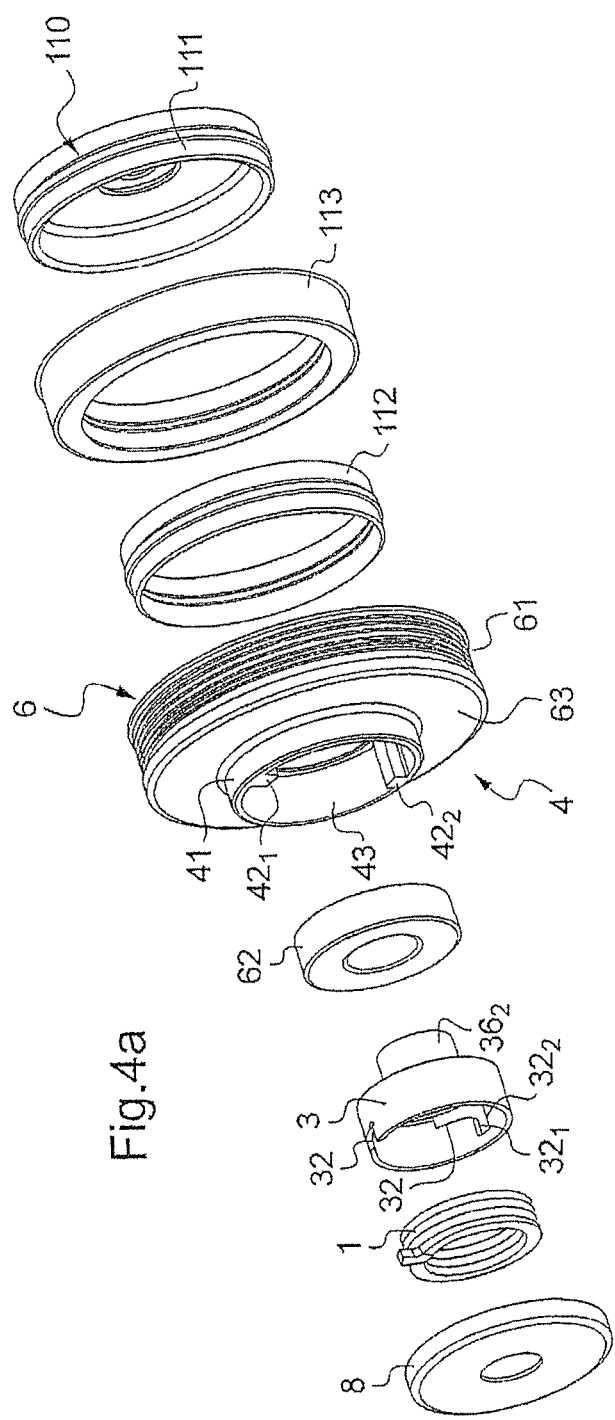
Figure 4B:
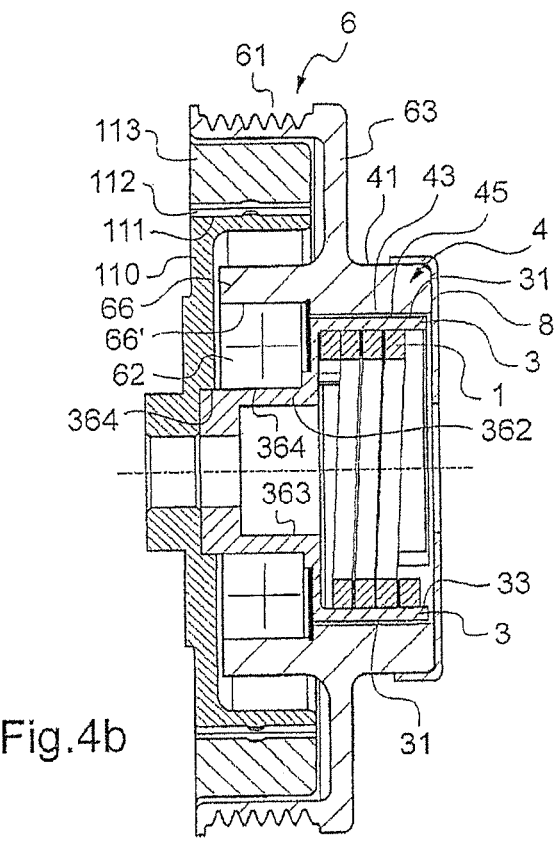

the following FIGS. 3a to 3e; 4a, 4b; 5a to 5e) illustrate other variants of the invention in which two drive abutments cooperate alternately with one or other of the two end regions of the spring, namely:

FIGS. 3a to 3e relate to an accessory pulley, in this case an alternator pulley, with a skeleton diagram (3a), a view of the pulley in axial cross-section (3b), a perspective view of the pulley with partial cutaway (3c), an exploded view (3d) and a cross-sectional detail of a variant allowing for the addition of a constant resisting torque;

FIGS. 4a and 4b relate to a crankshaft pulley;

FIGS. 5a to 5e relate to an alternator/starter ("SAD") pulley;

FIGS. 6a to 6e represent spring variants;

FIGS. 7a to 7c represent a variant of the invention in which the noise-damping function is produced using an annular part in which is housed the end of the spring which is stressed to close;

and FIG. 8 illustrates a variant embodiment of the end of the spring when it is housed in the bell.

DETAILED DESCRIPTION OF THE INVENTION

It will be noted that, wherever possible, the same reference symbols have been retained for equivalent elements of the different variations.

In FIGS. 1a to 1d, the decoupling pulley comprises a torsion spring (for example a helical or tapered spring) 1 (FIG. 1b) comprising, for example, rectangular turns 11 or circular turns. Two bent-back end regions 12 and 14 (FIG. 1b) enable the spring 1 to be driven to close via their face 17, 17', which is adjacent to the external edge 15 of the turns 11. The other face 18, 18', which is adjacent to the internal edge 16 of the turns 11 and which could be used to drive the spring 11 in the direction of opening, is not used in the context of the present invention to drive the spring 1, but may serve as abutment to limit the angular movement of the spring 1 driven to close.

The spring 1 is centered inside a bell 3 in which its end regions 12 and 14 are in contact with bell abutments $32_2$ and 34. The end region 12 has an end 19 which extends radially beyond the outer cylindrical contour 31 of the bell 3 to enable the spring 1 to be driven to close via the face 17. The end region 14, however, does not extend radially (or virtually not) from the outer cylindrical contour 31 of the bell 3.

A cylindrical region 2 of the bell 3 allows for a forcible axial mounting of the bell 3 on the hub 5.

Two bearings 101 and 102 ensure the relative rotation and the axial retention of the rim 4 and of the hub 5. The rim 4 may have a cylindrical extension 6 including pulley teeth 61 to receive a ribbed belt (K-type automobile belt).

Figure 5A:
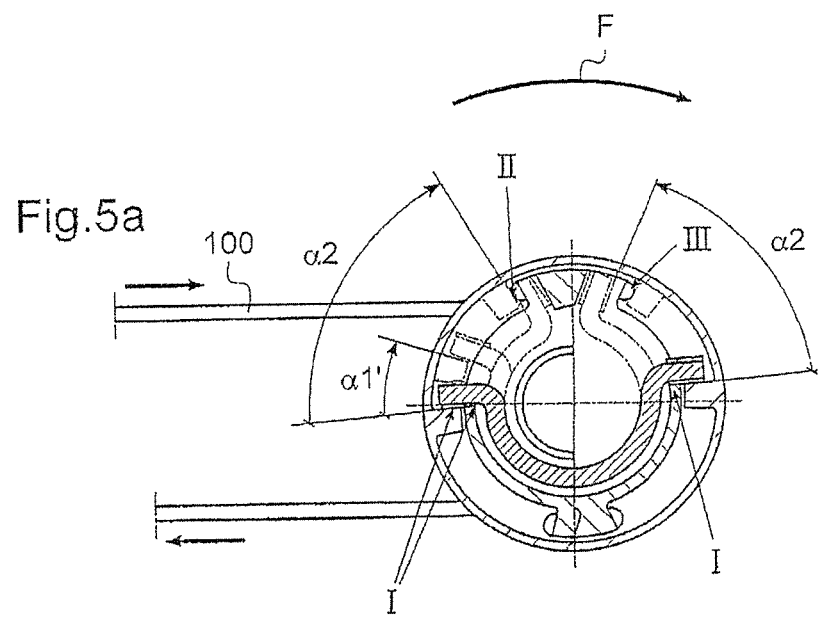
Figure 5D:
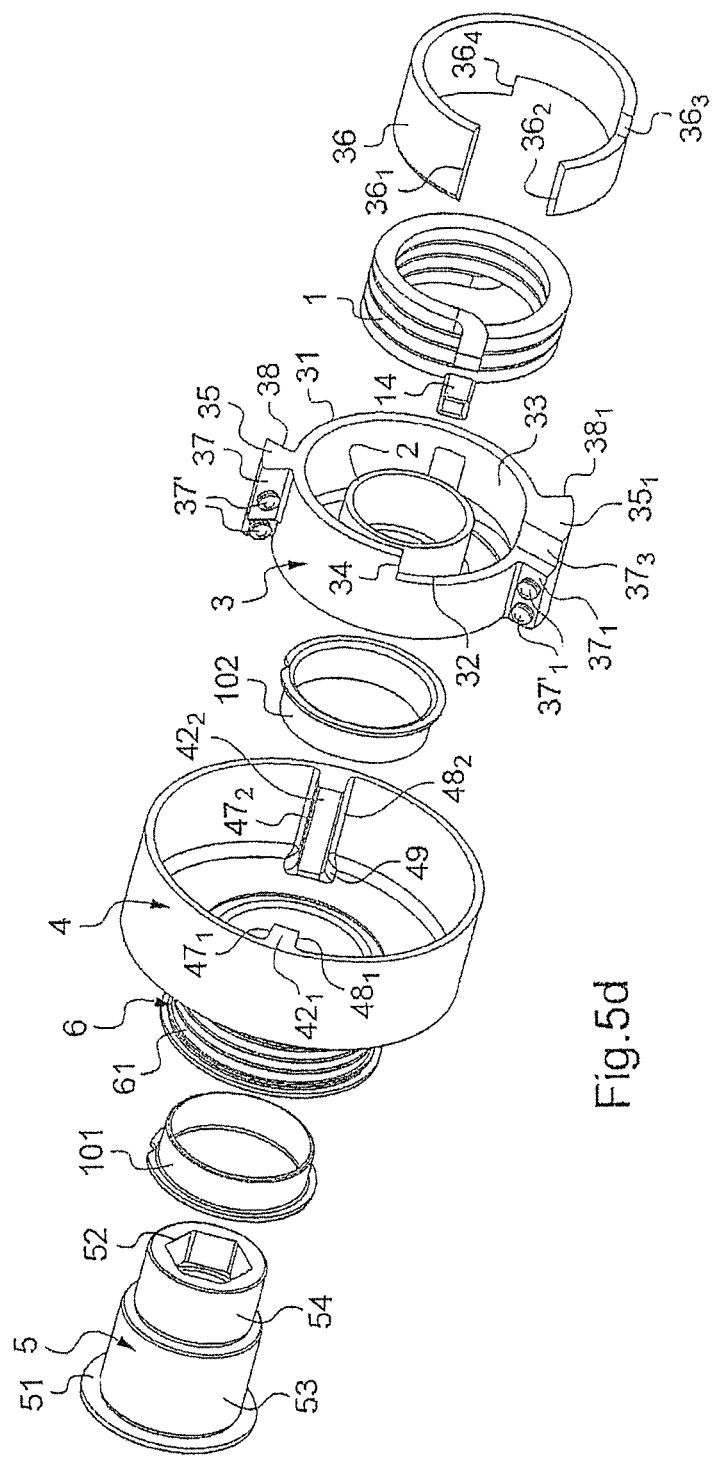

The centering of the spring 1, by its outer edge 15, in the bell 3 can be done directly via the inner contour 33 of the bell 3, or else, as represented, by a slotted centering ring 36 (ends $36_1$ and $36_2$) which can also be seen in the exploded view of FIG. 5d. It is positioned between the spring 1 and the bell 3 to facilitate the mounting of the spring.

The face 17 is in contact with the abutment $32_2$ and the face 17' is in contact with the abutment 34, these two abutments being angularly spaced apart by an angle which preferably allows for a slight pre-stressing (for example of the order of 1° to 5°) of the spring 1 in the direction of closure, which enables the spring never to move through its no-load and non-prestressed position and to oscillate on the basis of this pre-torsion in the direction of closure.

A rim 4 that is coaxial to the bell 3 surrounds said bell. It has a bottom 40, an outer cylindrical contour and an inner cylindrical contour 43, from which extends toward the interior an abutment finger 42 which has two opposite faces 47 and 48.

An opening 32, which possibly has a widened upstream region $32_1$ provided with an abutment $32_2$ for the end 12 of the spring 1, allows for an angular displacement of the end region 19 by an angle $\alpha_1$ until the face 47 comes into contact with a bell abutment 37. It is indeed more favorable for this abutment effect to be obtained via the face 47 of the abutment finger 42 rather than via the face 18 of the end 12.

This bell abutment is formed on a face 37 of a circular segment 35 of the bell 3 which protrudes from its outer cylindrical contour 31. The face 37 may have at least one elastic element 37'. Another face 38 of the circular segment 35 forms another bell abutment whose function will be explained later, and which may have at least one elastic element 38'.

The spring 1 may be impregnated with grease to reduce friction. Alternatively, a centering piece such as 36 may be housed outside the spring 1 to enable the spring 1 always to work in the same radial position and reduce the friction. The centering piece 36 is rotationally linked to the bell 3 for example by a pin or a finger.

A hub 5 is securely attached in rotation to the assembly consisting of the spring 1 and the bell 3, and, where appropriate, the centering ring 36.

The rim 4 may be a driving element (for example, accessory pulley), the driven element then being the hub 5, or else a driven element (for example, crankshaft pulley), the driving element then being the hub 5. In the case of an alternator/starter pulley, in motor vehicle engine starting mode, the hub 5 is driving, and in started mode, it is the rim 4 which is driving.

Figure 1A:
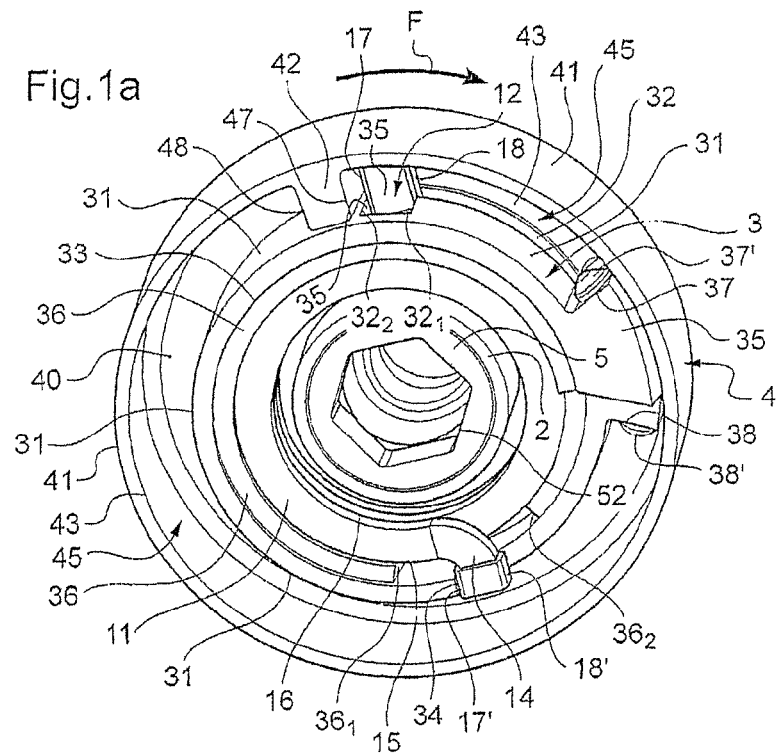
Figure 1B:
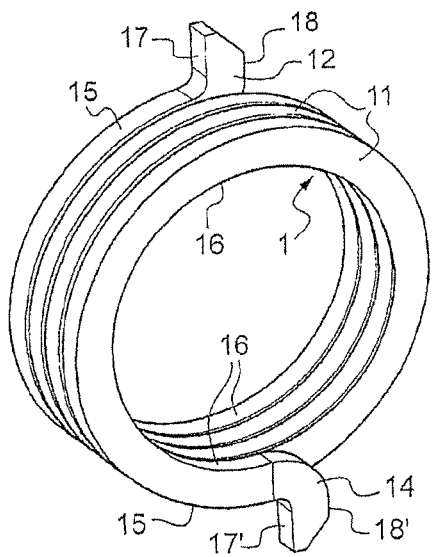
Figure 1C:
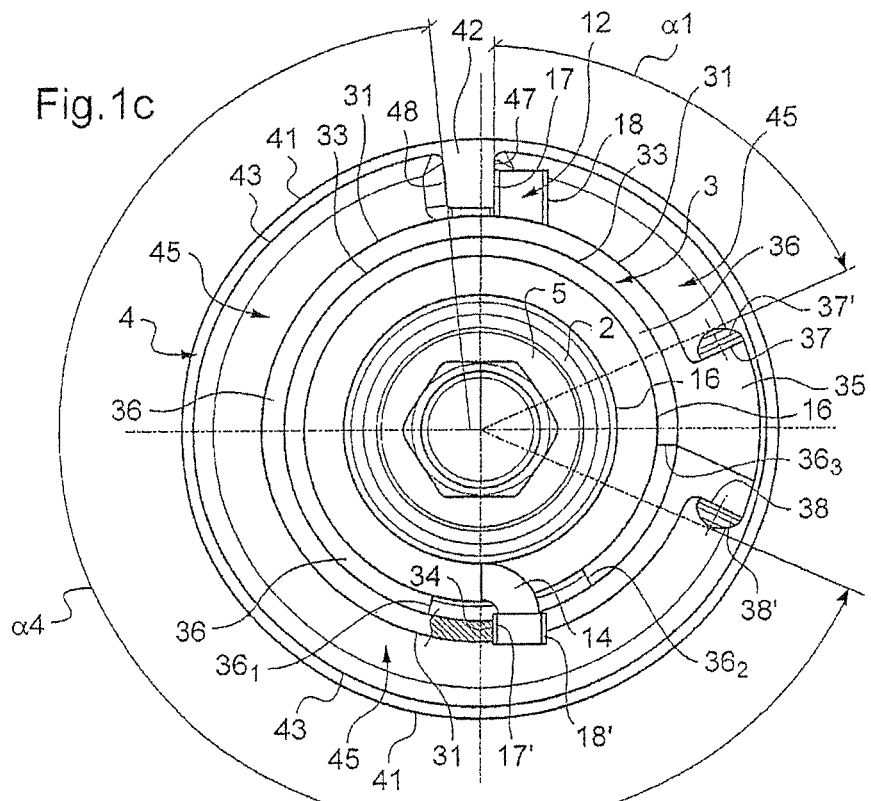
Figure 1D:
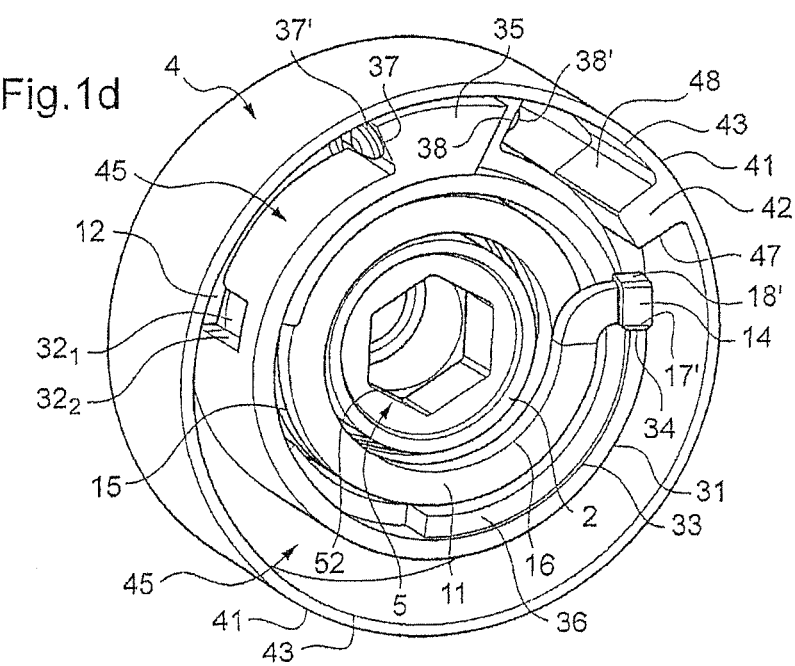

The operation is as follows: from the rest position (FIG. 1*a*), a relative speed of the rim 4 that is higher than that of the hub 5 in the direction of the arrow F, which is also the direction of rotation of the engine, places the face 47 of the abutment 42 in contact with the face 17 of the end 12, by rotationally driving along the opening 32, which drives the torsion spring 1 in the direction of closure, whereas the face 17' remains in contact with the abutment 34. This rotary movement may continue until the abutment 37 is reached, preferably by the face 47 of the abutment 42 which laterally protrudes from the face 17, which corresponds to a maximum angular amplitude $\alpha_1$ (FIG. 1*c*). The end 12 which circulates in the opening 32 is concealed behind the circular segment 35.

Figure 1E:
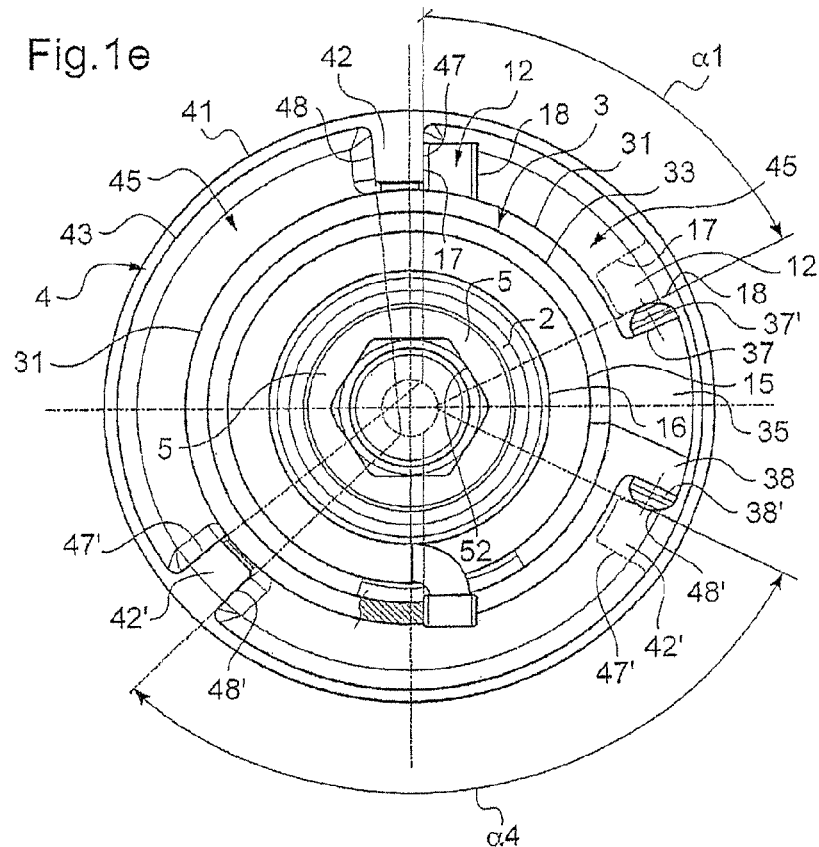

If, on the other hand, the angular speed of the rim 4 is less than that of the hub 5, then the abutment 42 of the rim 4 may be displaced freely in a circular segment 45 which exists between the outer cylindrical contour 31 of the bell and the inner cylindrical contour 43 of the rim. The circular segment 45 is in the form of a cylindrical segment. This contra-rotational movement can continue until the abutment 38 is reached by the face 48 of the abutment finger 42, which corresponds to a maximum angular amplitude $\alpha_4$ (FIG. 1*c*). It is in order to increase to the maximum the value of the angle $\alpha_4$ that the end 14 of the spring 1 does not extend (or extends by very little) beyond the outer contour 31 of the bell 3 to allow free passage for the finger 42 of the rim 4. It is obviously possible to choose $\alpha_4$ so that this extension of the end 14 does not occur, by positioning an additional abutment 38 on another circular segment protruding from the outer contour 31 of the bell 3, or else, as represented in FIG. 1*e*, by positioning on the rim 4 the additional abutment finger 42' having opposite lateral faces 47' and 48'. This abutment finger 42' is spaced apart from the abutment finger 42 by an angular distance chosen according to the desired value of $\alpha_4$. This value $\alpha_4$ corresponds to the travel of the abutment finger 42' between the rest position represented in FIG. 1*c* and the abutting of the face 48' of the abutment 38 (position represented by broken lines in FIG. 1*c*). It is also possible to cancel $\alpha_4$.

The preferred solution (FIG. 1*a* to 1*c*) is, however, to provide a maximum value of $\alpha_4$ to benefit from the rotation of the abutment finger 42 in the cylindrical segment 45 and of the rim 4. This rotation is performed with constant torque, namely, either with zero torque (not counting any residual friction) or with torque of a given value, by providing a friction element, for example, between the rim 4 and the hub 5.

Figure 1F:
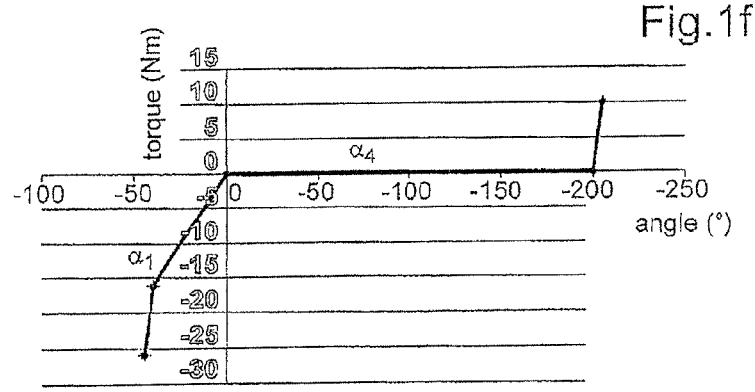

FIGS. 1*f* and 1*g* show the characteristics of the pulley described above. In FIG. 1*f* (zero torque), there is, in a so-called deceleration mode, a zero torque up to $\alpha_4=200°$, and in the so-called acceleration direction, an increasing torque given by the spring 1 up to $\alpha_1=-40°$. Beyond these values, the torque is raised, induced by the elastic abutments 37' and 38'. FIG. 1*g* represents the characteristic, when a friction torque is added, which produces a constant offset of the characteristic in one relative rotational direction and in the other.

The variant described above therefore has two modes:
An acceleration mode of the rim 4 relative to the hub 5 which is decoupled by the spring 1 until abutment is performed at 37;
A relative deceleration mode of the rim 4 relative to the hub 5, which is decoupled by the rotation with constant torque of amplitude $\alpha_4$ of the abutment finger in the cylindrical segment 45, until abutment is performed at 38. It will be noted that $\alpha_4$ may be zero, notably for an alternator/starter pulley.

The elastic elements 37' and 38', for example made of elastomer, are used to damp the end-of-travel abutment.

Since the abutment finger 42 is positioned so that only its face 47 can come into contact with the end 12 of the spring 1 to command the latter to close via the lateral face 17, the operation is the same regardless of whether the rim 4 or the hub 5 is the driving element (or the driven element).

Figure 2C:
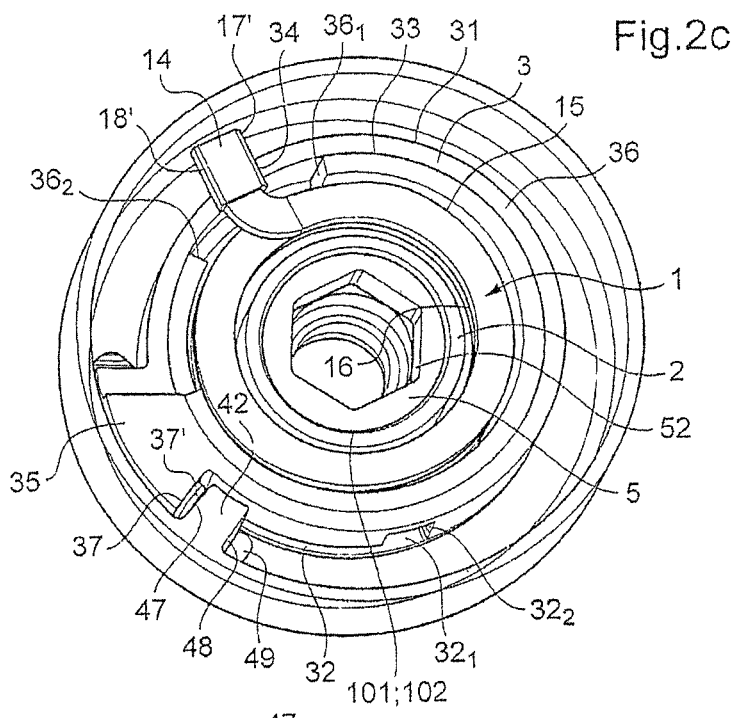
Figure 2D:
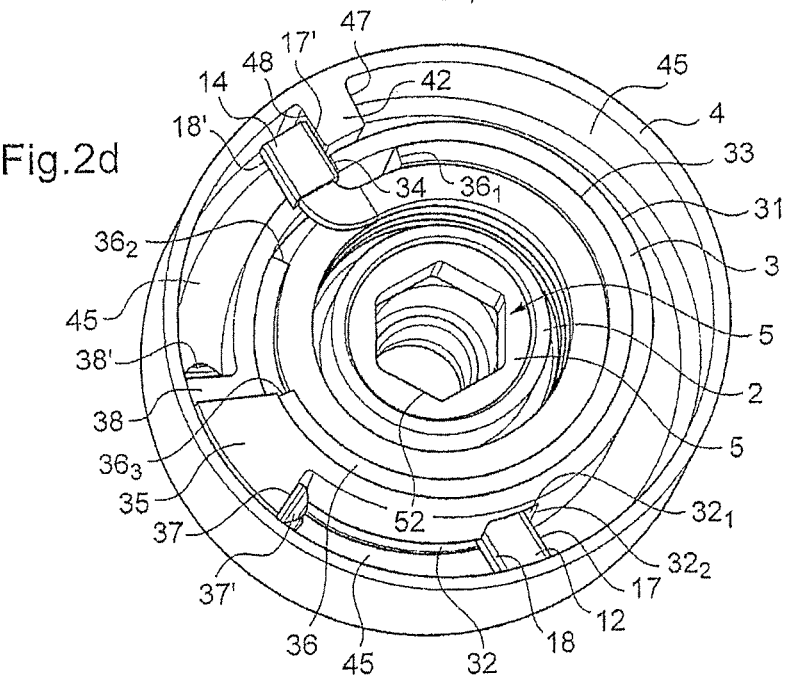

FIGS. 2*a* to 2*c* relate to another variant in which the abutment finger 42 commands the spring 1 to close alternately from one or other of its ends 12 and 14, which, at rest, are in abutment at $32_2$ and 34.

In this embodiment, from a rest position represented in FIG. 2*a*, the bell abutment 42 can drive the spring 1 in the direction of closure either via its face 47 which comes into contact with the face 17 of the end 12 (as in the preceding variant), or via its opposite face 48 which comes into contact with the face 17' of the end 14 which extends beyond the outer contour 31. The abutment finger 42 is displaced angularly between the faces 17 and 17' of the ends 12 and 14 of the spring 1 which command the latter to close, so that the operation depends only on the relative speed of the rim 4 and of the hub 5, regardless of which of these two elements is driving, and is unaffected by the direction of rotation of the pulley.

The spring 1 is driven to close via its end 12 with a maximum angular travel $\alpha_1$ before the face 47 comes into abutment at 37 (possibly with an elastic element 37'), or via its end 14 with a maximum angular travel $\alpha_2$ before its face 48 comes into abutment at 38 (possibly with an elastic element 38'). The values $\alpha_1$ and $\alpha_2$ may be equal ($\alpha_1=\alpha_2$) or different ($\alpha_1 \neq \alpha_2$).

FIG. 2*b* represents the abutment finger 42 in its four different characteristic positions, namely, on the one hand, a rest position represented by solid lines, on the other hand, an abutment position at 37 of its face (angular travel $\alpha_1$) represented by dotted lines, then a contact position between its face 48 and the face 47' of the end 14 of the spring (travel $\alpha_3$), and finally, an abutment position at 38 of its face 48 (travel $\alpha_2$).

Between the ends 12 and 14, there is a maximum angular travel $\alpha_3$ which should preferably be chosen to be as great as possible. It is also possible to reduce the value of $\alpha_3$, even to cancel it for example by adjusting the angular difference between the ends 12 and 14 of the spring 1 (see for example the spring represented in FIG. 6*a*).

Figure 2E:
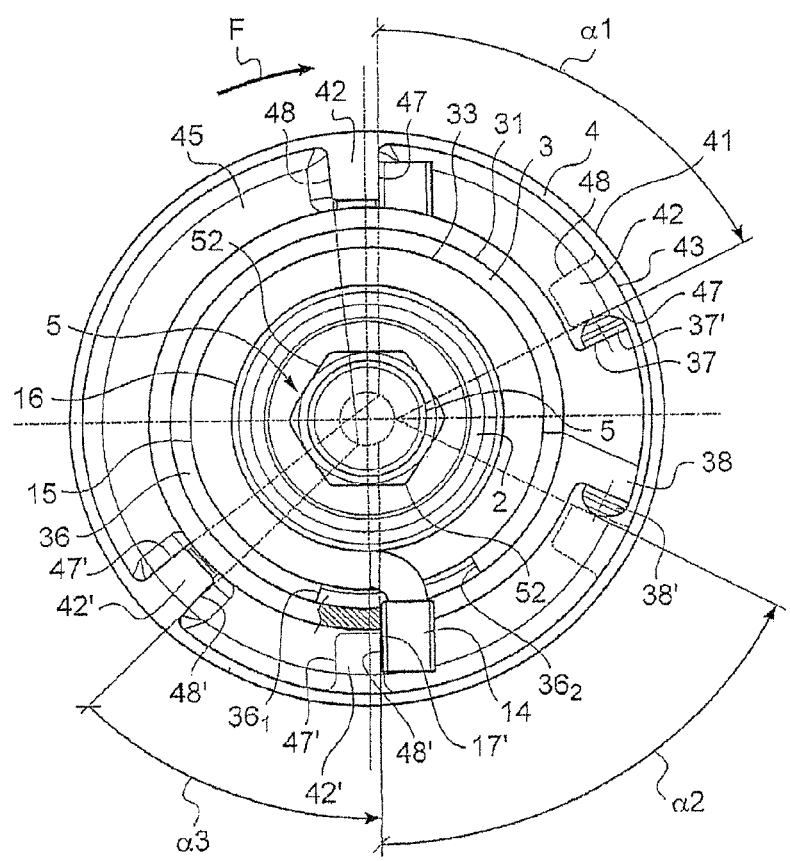

FIG. 2*e* shows an embodiment in which the value of the angle $\alpha_3$ is reduced because of the presence of an additional abutment finger 42' angularly spaced apart from the abutment finger 42.

In this embodiment, the abutment finger 42 is displaced (arrow F) with an angular amplitude $\alpha_1$ between a rest position in which it is represented by solid lines and an abutment position (face 47 in abutment at 37) represented by dotted lines.

When the rim 4 decelerates relative to the hub 5, the angular travel $\alpha_3$ of the abutment finger 42 is limited by the contact of the face 48' of the abutment finger 42' with the face 17' of the end 14 of the spring 1, after which the abutment finger drives, via its face 48', the end 14 of the spring 1 toward the abutment 38, 38', according to an angular travel of maximum value $\alpha_3$.

In other words, the angle $\alpha_3$ is limited by the presence of a second abutment finger 42' angularly spaced apart from the end 14 of the spring 1 to obtain the desired angle $\alpha_3$.

Figure 2F:
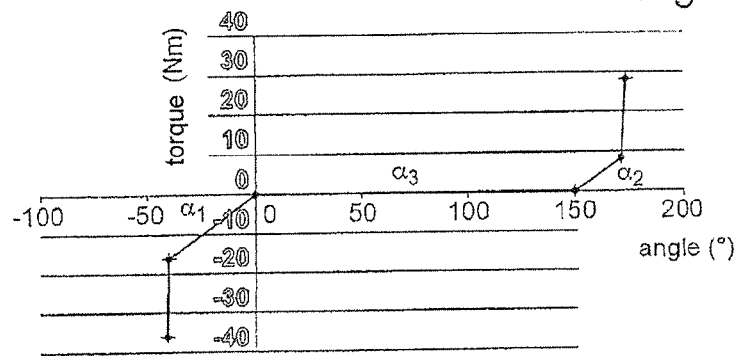
Figure 2G:
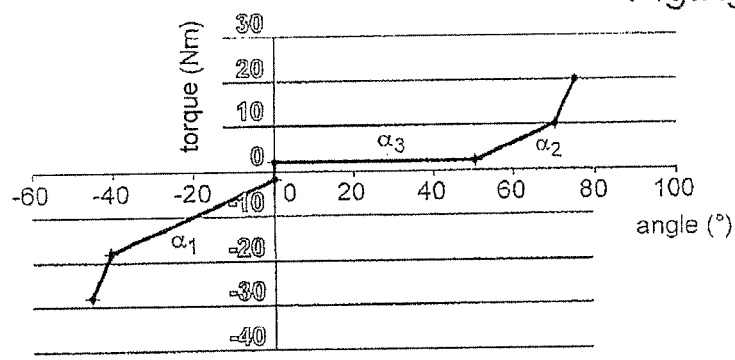

FIGS. 2*f* and 2*g* show, for example, characteristics of the pulley of FIGS. 2*a* to 2*c* in the case where the area of constant torque has zero torque, that is to say, torque limited to the residual frictions (FIG. 2f) or else with a torque of given value supplied by a friction element (FIG. 2g), which produces a constant offset of the characteristic in one rotational direction and in the other. In this example, $\alpha_1=-40°$, $\alpha_2=20°$ and $\alpha_3=150°$ for FIG. 2f, and $\alpha_3=50°$ for FIG. 2g.

Figure 3A:
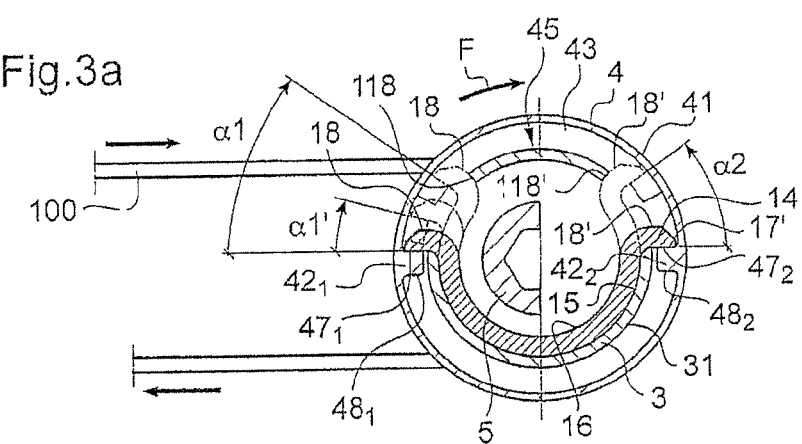

FIGS. 3a to 3d represent a variant in which only travels according to the angles $\alpha_1$ and $\alpha_2$ are provided ($\alpha_3=0$) by virtue of the implementation of two rim abutments $42_1$ and $42_2$ which are in contact, in the mounted position, with the faces 17 and 17' of the ends 12 and 14 of the spring 1 (FIG. 3a).

The pulley represented as an example is an alternator pulley for which the rim 4 is the driving element, by virtue of the motive energy supplied by the transmission belt 100 and for which the hub 5 is the driven element which drives the alternator (not represented).

Figure 3D:
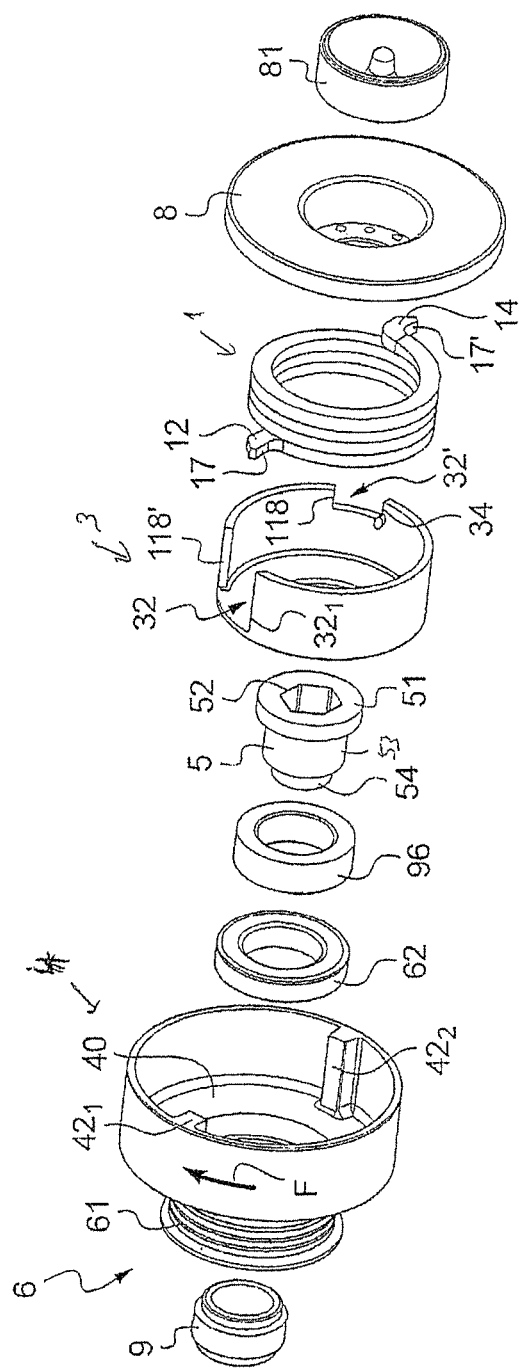

According to the cross-sectional view 3b, the perspective view 3c (with removal of the cover 8) and the exploded view of FIG. 3d, the pulley comprises:

a rim 4 which has a bottom 40, a cylindrical outer contour 41, a cylindrical inner contour 43, and two abutment fingers $41_1$ and $42_2$ which are, in this example, diametrically opposite; this rim 4 has a cylindrical extension 6 of smaller diameter which includes pulley teeth 61 to receive a ribbed belt (K-type automobile belt);

a bell 3 whose inner contour 33 serves to center the spring 1. The bell has two openings 32 and 32' for the angular travel of the ends 12 and 14 of the spring 1; the faces 18 and 18' of the ends 12 and 14 come into abutment on the faces, respectively 118, 118', of the openings 32, 32' (FIG. 3d), and the abutments 37 and 38 are not present (this variant can be implemented for each of the embodiments represented);

a hub 5 having a head provided with a hexagonal opening 52 used for tightening onto the shaft of an alternator, and comprising a central cylindrical region 53, and an end cylindrical region 54 of smaller diameter than the central region 53;

a cover 8, provided with a plug 81, whose edge fits into a housing of the rim 4;

an assembly comprising a cylindrical bearing part 9 and a spacer 96, the cylindrical bearing part 9 being force-fitted between the periphery of the end region 54 and the inner contour of a rolling bearing 62, with the interposition of a spacer 96 (with compression of the Belleville washer 92).

FIG. 3e illustrates a variant in which a constant friction torque is introduced between the part 9 securely attached to the shaft of the alternator (through the successive tightening of the latter on the inner contour of a rolling bearing 63 and of the hub 5, which is in turn tightened onto the inner contour of the rolling bearing 62) and the extension 65 of the rim 4. An assembly comprising a Belleville washer 92, a washer 93 and a friction washer 94, for example of PTFE, is sandwiched (with compression of the Belleville washer 92) between annular shoulder 91 of the part 9 and an annular shoulder 65 of the extension 61.

FIGS. 4a and 4b represent another variant, namely a crankshaft pulley in which only travels according to the angles $\alpha_1$ and $\alpha_2$ are provided. The hub 5 is, in this case, the driving element and the rim 4 is the driven element.

The same applies for FIGS. 5a to 5g which represent an alternator/starter pulley (SAD); in this case, the rim 4 and the hub 5 are alternately driving and driven depending on whether the current mode is starter mode or alternator mode. In starter mode, the hub 5 is driving whereas, in alternator mode, it is the rim 4 which is driving.

These examples confirm that the concept of the invention depends on the relative rotational movements, but is independent of the driving or driven nature of the rim 4 or of the hub 5, and that, in the case where the two ends 12 and 14 of the spring 1 are used to control it to close, there is also independence with regard to the direction of rotation of the driving element.

The crankshaft pulley represented in FIGS. 4a and 4b comprises:

a rim 4 comprising an outer cylindrical contour 41, and an inner cylindrical contour 43 provided with two abutment fingers $42_1$ and $42_2$, which are, in this example, diametrically opposite; this rim has a main cylindrical region 6 of larger diameter than the outer contour 41 and which includes pulley teeth 61 to receive a ribbed belt (K-type automobile belt). The rim 4 extends inside the main region 6 via a cylindrical extension 66;

a bell 3 whose inner contour 33 is used directly for the centering of the spring 1. There is no longer any internal centering piece provided, such as 36. The bell 3 has two openings 32 to allow the angular travel of the ends 32 and 34 of the spring 1.

A rolling bearing 62 is housed between the outer contour 364 of a cylindrical extension 362 of the bell and the inner contour 66' of the cylindrical extension 66.

The inner contour 363 of the extension 362 has, for example, a cylindrical shape to allow for the passage of a fixing screw to enable coupling to the crankshaft.

A cover 8 is fitted onto the contour 41 of the rim.

At the other end, a flange 110 is mounted centered on the outer contour 364.

Its outer cylindrical contour 111 receives, by force fitting, a cylindrical part 112 of polymeric type and a mass 113, these two parts making it possible to provide, in a known manner, a filtering of the high-frequency vibrations of the crankshaft (damping of the torsional vibrations AVT).

FIGS. 5a to 5e relate to an alternator/starter pulley (so-called SAD system).

The engine of the vehicle revolves, for example, in the direction of the arrow F. In FIG. 5a, $\alpha_1$ then designates the angle of travel due to the electric torque of the alternator (driving rim).

In FIG. 5a, $\alpha_2$ designates the angle of travel when the hub 5 is driving (starter mode).

The so-called rest position I corresponds to a double contact between the rim and the spring and between the bell and the spring.

The position II corresponds to a contact between the rim 4 and the spring 1 in the position of maximum angular travel $\alpha_1$.

The position III corresponds to a contact between the rim 4 and the spring in the position of maximum angular travel $\alpha_2$.

FIG. 5b (bottom view) shows the belt 100 mounted close to the face 105 situated on the alternator side (when the pulley is mounted).

FIGS. 5c and 5d illustrate the assembly of the pulley. In this embodiment, additional bell abutments (optional) $35_1$, $37_1$, $38_1$ are provided, the function of which will be explained below.

This embodiment allows for travel according to the angles $\alpha_1$ and $\alpha_2$ only, the presence of an area with constant angular torque not being desirable in this application.

The alternator/starter pulley comprises (see FIGS. 5c and 5d):

a rim 4 comprising an outer cylindrical contour 41, an inner cylindrical contour 43 provided with two abutment fingers $41_1$ and $42_2$, which are, in this example, diametrically opposite; this rim 4 has a cylindrical region 6 of smaller diameter than the cylindrical contour 41, and provided with teeth 61 to receive a ribbed belt (K-type automobile belt);

a bell 3 whose inner contour 33 receives a slotted ring 36, the edges of which are designated $36_1$ and $36_4$, and which has openings ending at $36_3$ and $36_4$ for the passage of the ends 12 and 14 of the spring 1 when they rotate. The slotted ring 36 is used for the centering of the spring 1 on its outer diameter; on the edge 31 of the bell 3, there are two circular segments 35 and $35_1$ each provided with abutment faces, respectively 37, 38, and $37_1$, $38_1$, possibly provided with damping elements, respectively (37', 38'), and ($37'_1$, $38'_4$).

A hub 5 comprising a collar 51 provided with a hexagonal opening 52 for coupling to the shaft of an alternator and comprising a central cylindrical region and an end cylindrical region 54 of smaller diameter.

A bearing in two parts 101, 102 to ensure the relative rotation between the rim 4 and the hub 5; the bearings 101 and 102 are fitted into the rim 4 to allow for a rotational guidance over the central region 53 of the hub 5.

Operation will now be described in relation to FIG. 5e.

In a phase in which the rim 4 is accelerating relative to the hub 5, the end 12 of the spring is driven to close by its face 17 in contact with the face $47_1$ of the abutment finger $42_1$, until the face $47_1$ comes into abutment at 37, 37' in the position represented by dotted lines.

The rotation of the rim 4 at the same time drives the abutment finger $42_2$ which is disengaged from the contact between its face $47_2$ and the face 17' of the end 14, until its face $48_2$ comes into abutment at $38_1$ as represented by dotted lines. There is thus obtained, after an angular movement of amplitude $\alpha_1$, a double abutment effect at 37 and 38' with possible damping by the elements 37' and $38'_1$.

In the case of a rotation of amplitude $\alpha_2$ of the driving hub 5, a symmetrical effect is produced.

In practice, the base $47_2$ of the abutment finger $42_2$ drives, via its face 17', the end 14, until the face $47_2$ comes into abutment at 38 (in the position represented by dotted lines). The abutment finger $42_1$ is then in abutment via its face $48_1$ on the abutment $37_1$. As previously, there is the benefit of a double abutment effect, with the possible presence of damping elements 38' and $37'_1$.

This arrangement, which could also be implemented in the other embodiments of the invention, is particularly interesting in the particular application which is considered here, because of the significant forces transmitted by an alternator/starter pulley.

FIGS. 6a to 6e represent spring variants.

In FIG. 6a, the faces 17 and 17' are positioned in the same plane (or in the vicinity of one another), which has the effect of limiting the resultant radial forces on the bell 3. In this embodiment, the abutments 42 do not occupy all the axial length of the bell 3.

In FIGS. 6b to 6d, the ends 120 and 140 of the spring 1 are situated in the extension of the turns 11, with no bent-back regions and their displacement is controlled to close by their faces 170 and 170' by virtue of wedge-shaped abutment fingers $142_1$ and $142_2$ (FIGS. 6c and 6d) which have planar faces $147_1$ and $147_2$ which bear flat on the faces 170 and 170'.

In FIG. 6e, the ends of the spring 1, situated in the extension of the turns, are little or not at all angularly offset in order to have a whole number of turns.

FIGS. 7a to 7c are a variant of the invention in which the end 12 of the spring is housed in an intermediate part, namely a ring 9 centered relative to the bell 3, the function of which is to reduce the impact of the shocks on the end 12 of the spring 1 by which the latter is driven to close. This ring 9 is thus preferably made of a noise-reducing non-metallic material (for example polyamide or polyurethane) or else it has at least one contact face 92, coated with an impact damping material such as an elastomer or an elastomeric thermoplastic material (TPE). This ring 9 makes it possible notably to fulfill or complement the function of the abovementioned elastic elements 37' or 38' interposed between the faces 47 and 48 and the abutments, respectively 37 and 38, which may, however, be implemented in the present variant.

A cylindrical hub 5 provided with a head 51 and a cylindrical region 53, securely attached in rotation to the bell 3, allows for mounting on a shaft, for example of an alternator, via its hexagonal opening 52.

The references 201 and 202 designate bearings interposed between the bell 3 and the rim 4, and 203 designates a possible friction washer. The rim 4 is, for example, made of aluminum or a plastic material (polyamide, thermosetting resin). The bearings 201 and 202 may be overmolded, as may the washer 203. A gasket 204 ensures seal-tightness around a bearing washer 205. The bearing washer 205 possibly has an extension 206 for centering the bell 3 in an opening 315 of its bottom 313.

The cover 8 provided with a plug 81 is fitted by its edge 82 into the outer contour 41 of the rim 4.

The spring 1 has an axial branch 41 housed in a slot 314 formed in the bell. The radial branch 12 which serves to drive the spring 1 to close is housed in a slot 94 of the ring 9 which is formed in an annular segment 91 bounded on either side by an abutment 92 which cooperates with the face 47 of the abutment 42 of the rim 4 to control the spring 1 to close and with the abutment 393 of the bell 3 to then limit the angular travel of the spring 1 to the angular value $\alpha_1$. The face 47 of the rim abutment thus comes into contact with the abutment 92 of the ring 9 to drive the spring to close and $\alpha_1$ is the angle between the face 93 of the ring 9 and the face 393 of the bell 3.

The face 470' of the rim abutment 420 comes into contact with the abutment 93 of the ring 9, $\alpha_4$ is the angle travelled by the face 470' until its contact at 93.

The edge of the ring 9 and of the bell 3 may have at least one other annular segment (95, 395) which makes it possible to split the abutments used to define the angles $\alpha_1$ and possibly $\alpha_4$.

The addition of the ring 9 makes it possible to avoid the direct contacts between the spring 1 and the rim 4 on the one hand, and between the spring 1 and the bell 3 on the other hand, the contacts which generate noise by metal-on-metal contact. In this variant in fact, all the contacts due to the relative movements between the parts take place on the annular part 9, the branches (12, 14) of the spring being tightly housed on the ring 9 and/or on the bell 3. In the case of the variants employing the angles $\alpha_2$ and/or $\alpha_3$, it is possible to implement a second ring 9.

FIG. 8 is a variant of the FIGS. 7a and 7b in which the axial branch 14 is replaced by an inwardly-bent branch 144 of the spring which is received in a housing (fixing groove 320) of the bell 3. This variant can also be implemented in the case of the other embodiments described which do not include a ring 9.

The invention claimed is:

1. A decoupling pulley comprising;
   a rim securely attached to a first power transmission element,
   a bell securely attached to a second power transmission element
   one of the power transmission elements being driving and the other of the power transmission elements being driven, and a torsion spring having several turns mounted in and centered inside the bell, which spring has a first and a second end region, wherein the rim is coaxial to the bell, surrounds the bell and has at least one first drive abutment having a first face cooperating with the first end region of the spring to drive the latter in a first relative rotational direction between the rim and the bell which corresponds to a direction of closure whereas the second end region of the spring bears on a bearing face of the bell, and wherein the bell comprises at least one first bell abutment, the angular position of which defines a first given maximum value ($\alpha_1$) for the travel of the first end region of the torsion spring driven to close by said first drive abutment.

2. The pulley as claimed in claim 1, wherein only said first end region of the spring cooperates via said first face with the first drive abutment, so that the second end region of the spring bears on its bearing face.

3. The pulley as claimed in claim 2, wherein, for a second relative rotational direction between the rim and the bell opposite said first rotational direction, the periphery of the bell has an angular segment of rotation with constant torque for the first drive abutment over an angular travel ($\alpha_4$) between the first end of the spring and a second bell abutment.

4. The pulley as claimed in claim 3, wherein the second end region of the spring is disengaged from the angular segment to allow the passage from the first drive abutment to said second bell abutment.

5. The pulley as claimed in claim 1, wherein the second end region of the spring is bent toward the interior of the spring and countersunk in a countersink groove provided in the bell.

6. The pulley as claimed in claim 1, wherein said first end region and said second end region of the spring cooperate alternately according to, respectively, said first relative rotational direction between the rim and the bell and a second relative rotational direction between the rim and the bell opposite said first rotational direction with said first drive abutment of the rim to drive the spring to close, and wherein the bell has a third bell abutment, the angular position of which defines a second given maximum value ($\alpha_2$) for the travel of the second end region of the spring driven to close by a second face of the first drive abutment opposite the first face.

7. The pulley as claimed in claim 6, wherein the bell has an angular segment of free rotation for the first drive abutment over an angular travel ($\alpha_3$) between the first and the second end of the spring.

8. The pulley as claimed in claim 1, wherein the spring has one said first end region cooperating with said first face of said first drive abutment and one said second end region cooperating with a first face of a second drive abutment to drive the spring in the direction of closure in a second rotational direction opposite to the first rotational direction, and wherein the bell has one said third bell abutment, the angular position of which defines a second given maximum value $\alpha_2$ for the travel of the second end region of the spring driven to close by the second drive abutment.

9. The pulley as claimed in claim 8, wherein the bell has a fourth and a fifth bell abutment respectively allowing one said angular travel ($\alpha_1$) for the second drive abutment when the first end of the spring is driven to close by the first face of the first drive abutment and one said angular travel ($\alpha_2$) for the first drive abutment when the second end of the spring is driven to close by the first face of the second drive abutment.

10. The pulley as claimed in claim 6, wherein $\alpha_1 \neq \alpha_2$.

11. The pulley as claimed in claim 6, wherein $\alpha_1 = \alpha_2$.

12. The pulley as claimed in claim 1, wherein at least one said bell abutment has a face cooperating with one said face of one said drive abutment to define one said given maximum value $\alpha_1$ and/or $\alpha_2$.

13. The pulley as claimed in claim 1, wherein at least one said bell abutment comprises at least one damping element.

14. The pulley as claimed in claim 1, wherein at least one said bell abutment has a face cooperating with one said face of an end region of the spring to define one said given maximum value $\alpha_1$ and/or $\alpha_2$.

15. The pulley as claimed in claim 1, wherein it includes a friction element introducing a constant torque between the first and the second power transmission elements.

16. The pulley as claimed in claim 1, wherein the first and/or the second end region is in contact with said bearing face.

17. The pulley as claimed in claim 1, wherein it includes an annular part centered on the bell and which has a housing which receives the first end region of the spring, this housing having at least one contact face, which is in contact with said bearing face of the bell.

18. The pulley as claimed in claim 17, wherein the annular part is made of a non-metallic material attenuating noises due to impacts, such as polyamide or polyurethane.

19. The pulley as claimed in claim 17, wherein the annular part has at least one contact face coated with an impact-damping material such as an elastomer or an elastomeric thermoplastic material.

20. The pulley as claimed in claim 1, wherein it is an automobile accessory pulley and wherein the first power transmission element comprises teeth to receive the teeth of a K-type belt, and wherein the second power transmission element has a coupling element for coupling to one said accessory.

21. The pulley as claimed in claim 1, wherein it is a crankshaft pulley and wherein the second transmission element comprises a coupling element for coupling to a crankshaft, and wherein the first power transmission element comprises teeth to receive the teeth of a K-type belt.

* * * * *